March 10, 1931.   H. E. DENNIE   1,796,006
HOSE CLAMP
Filed March 6, 1930
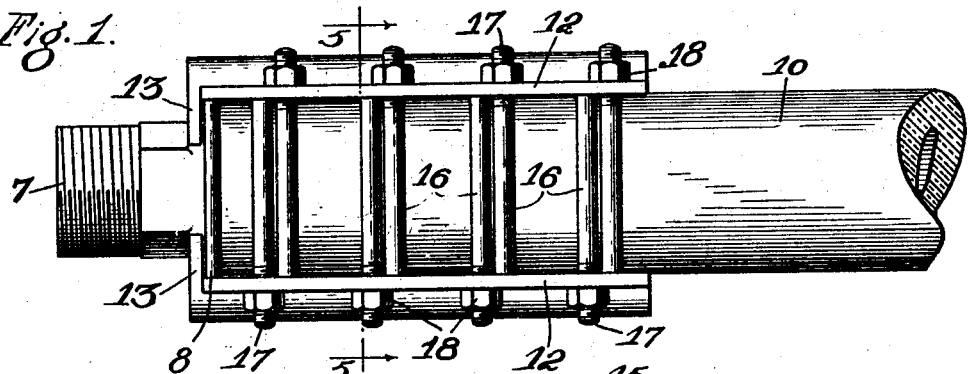
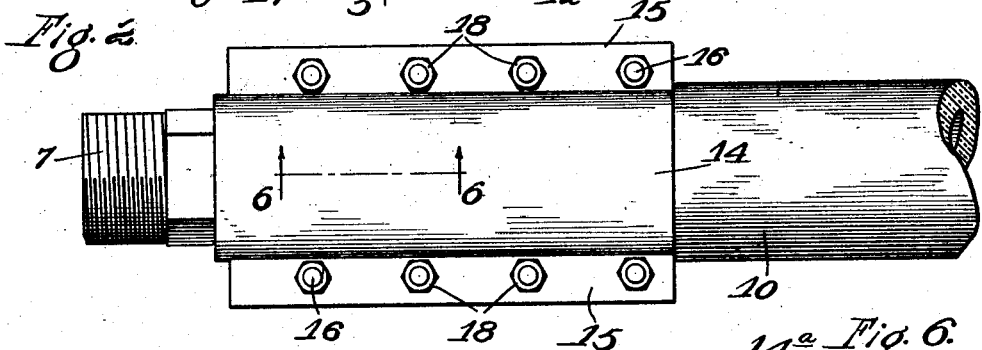
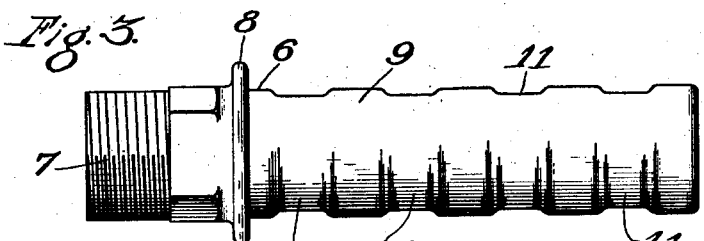
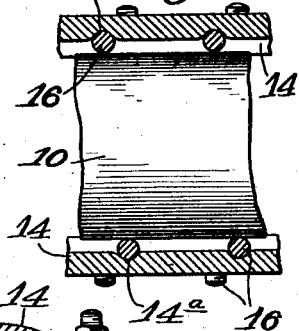
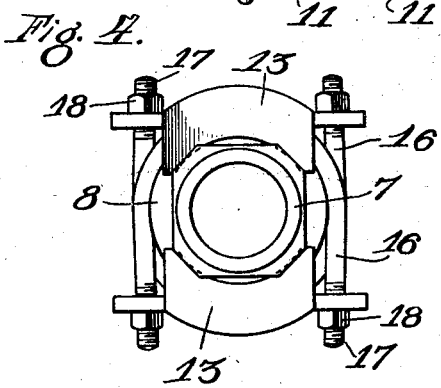
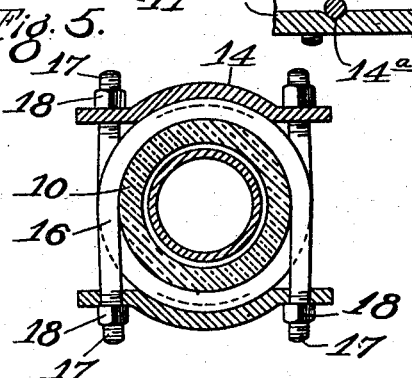
Inventor.
Harry E. Dennie.
By Dyrenforth, Lee, Chritton & Wiles
Attys.

Patented Mar. 10, 1931

1,796,006

UNITED STATES PATENT OFFICE

HARRY E. DENNIE, OF CHICAGO, ILLINOIS

HOSE CLAMP

Application filed March 6, 1930. Serial No. 433,791.

My invention relates more particularly to clamps for connecting flexible hose to the jointed metal couplers of a pipe especially for use in the conveying of high pressure fluid such as water; an example of the use of such a pipe being for the conducting of water under very high pressure into the rotary drill pipe of oil-well-drilling apparatus.

My primary object is to provide a clamp of such construction that the flexible hose will be retained, against leakage, on the coupler in the use of the pipe for conducting fluid under high pressure.

Another object is to provide a simple and economical construction of such a clamp and by which the hose may be readily applied to the coupler.

Referring to the accompanying drawings:

Figure 1 is a view in side elevation of a pipe-coupler member having a hose, shown partly broken away, secured thereto in accordance with my invention.

Figure 2 is a plan view of the structure shown in Fig. 1.

Figure 3 is a view in side elevation of the coupler of the preceding figures.

Figure 4 is an end view of the structure shown in Figs. 1 and 2, the structure being viewed from the left-hand side of these figures.

Figure 5 is a section taken at the line 5—5 on Fig. 4 and viewed in the direction of the arrows; and Figure 6, a broken section taken at the line 6—6 on Fig. 2 and viewed in the direction of the arrows.

In the construction shown 6 represents a metal coupler shown as threaded at one end as represented at 7 for connection with a similar coupler member in accordance with common practice, the member 7 being shown as provided with an annular flange 8 and beyond this flange with a portion 9 for insertion into the hose to be clamped to the member 7, the hose, which is commonly so-called rubber hose, being represented at 10, the portion 9 being provided at intervals with annular grooves 11, for a purpose hereinafter described.

The clamp, according to the particular illustrated embodiment of my invention, comprises platelike members 12 positioned at opposite sides of the hose 10 and each provided at one end with an inwardly extending lip 13 which overlaps the flange 8 as shown, each of these plates at the portions thereof between its lateral edges being curved transversely as represented at 14, concentrically of the hose 10. The marginal edge portions of the plates represented at 15 extend preferably substantially parallel with each other as represented in Figs. 4 and 5, and the inner surfaces of the curved portions 14 of the plates 12 contain grooves 14ª spaced apart along these plates and extending crosswise of the latter.

The clamp also comprises a plurality of U-shaped elements 16 shown as in the form of U-bolts, but which if desired may be of flexible construction, as for example in the form of cables, adjacent ones of these elements 16 extending in opposite directions as shown, the elements 16 straddling the hose 10 and extending at their threaded ends 17 through holes in the marginal edge portions 15 of the plates 12. Nuts 18 screwing upon these outwardly projecting threaded ends 17 of the elements 16 and against the outer faces of the plates 12 serve as means for tightening the elements 16 against the hose 10 to clamp it in place on the portion 9 of the coupler.

The U-shaped elements 16 are of such size that each snugly fits against the hose 10 throughout substantially one-half of the circumference of the latter, and they are preferably arranged in pairs as shown particularly in Fig. 1, the members of each pair extending preferably close together as shown and extending in opposite directions so that one of the elements 16 of each pair clamps the hose substantially throughout one-half of its circumference and the other element thereof clamps the hose at the remaining portion of its circumference.

Preferably the holes in the plates 12 for the ends of the elements 16 are spaced apart a distance slightly less than the inside diameter of the elements 16, as shown, whereby to ensure sufficient approach to uniform clamping of the hose throughout its circumference by the oppositely extending elements 16 of each pair thereof, as to avoid any pinching of the hose or bulging of the latter on the portion 9.

The annular grooves 11 are shown as so disposed that each registers with a pair of the elements 16, so that when the elements are drawn tight about the hose the latter is pressed into these grooves and the clamping of the hose to the coupler, against leakage, is thereby enhanced, the interlock of the flanges 13 of the plates 12, with the flange 8 of the coupler aiding in preventing the longitudinal separation of the coupler and the hose when subjected to very high internal pressure.

In the assembling of the clamp with a hose, the plates 12 and elements 16 are preferably first assembled with each other, and such assembly assembled with the hose by sliding the assembly upon the hose and, with the hose positioned on the portion 9 of the coupler, the elements 16 then tightened to properly grip the hose.

In this connection the provision of the grooves 14ª is of advantage. These grooves are disposed in registration with the curved portions of the elements 16 as shown, these curved portions extending into these grooves in the conditioning of the clamp for application to the hose, thereby preventing canting of the elements 16 and thus objectionable interference with the sliding of the clamp onto the hose in the assembling of these parts.

While I have illustrated and described a particular construction embodying my invention, I do not wish to be understood as intending to limit it thereto as the same may be variously modified and altered without departing from the spirit of my invention.

What I claim as new, and desire to secure by Letters Patent, is:

1. The combination of a coupler having a portion for insertion into a hose, a hose surrounding said portion, and a clamp for clamping said hose to said portion comprising U-shaped elements positioned crosswise on said hose and clamping the latter and extending in opposite directions.

2. The combination of a coupler having a portion for insertion into a hose, a hose surrounding said portion, and a clamp for clamping said hose to said portion comprising U-shaped elements positioned crosswise on said hose and clamping the latter and extending in opposite directions and closely adjacent each other.

3. The combination of a coupler having a portion for insertion into a hose, a hose surrounding said portion, and a clamp for clamping said hose to said portion comprising pairs of U-shaped elements positioned crosswise on said hose and clamping the latter, the members of each pair being located adjacent each other and extending in opposite directions.

4. The combination of a coupler having a portion for insertion into a hose, a hose surrounding said portion, a clamp for clamping said hose to said portion comprising U-shaped elements positioned crosswise on said hose and clamping the latter and extending in opposite directions, and means for drawing said members into clamping position on said hose.

5. The combination of a coupler having a portion for insertion into a hose and provided with circumferential grooves, a hose surrounding said portion and a clamp for clamping said hose to said portion comprising U-shaped elements positioned crosswise on said hose and clamping the latter, said elements registering with said grooves and extending in opposite directions.

6. The combination of a coupler having a portion for insertion into a hose, a hose surrounding said portion, and a clamp for clamping said hose to said portion comprising U-shaped elements positioned crosswise on said hose and clamping the latter and extending in opposite directions and closely adjacent each other, and means for drawing said elements into clamping position on said hose.

7. The combination of a coupler having a portion for insertion into a hose, a hose surrounding said portion, and a clamp for clamping said hose to said portion comprising U-shaped elements positioned crosswise on said hose and extending in opposite directions, and means at opposite sides of the hose for anchoring said elements.

8. The combination of a coupler having a portion for insertion into a hose, a hose surrounding said portion, and a clamp for clamping said hose to said portion comprising U-shaped elements positioned crosswise on said hose and extending in opposite directions, plates at opposite sides of the hose, and means engaging said plates and said elements for drawing said elements into clamping position on said hose.

9. The combination of a coupler having a portion for insertion into a hose, a hose surrounding said portion, and a clamp for clamping said hose to said portion comprising U-shaped elements positioned crosswise on said hose and extending in opposite directions, plates at opposite sides of the hose and containing openings through which said elements extend, and nuts screwed on the legs of said elements and against said plates, for the purpose set forth.

10. The combination of a coupler having a portion for insertion into a hose, a hose surrounding said portion, and a clamp for clamping said hose to said portion comprising U-shaped elements positioned crosswise on said hose and extending in opposite directions, means at opposite sides of the hose for anchoring said elements, and means for preventing relative longitudinal movement of said coupler and said first-named means in a direction for separating said coupler and said first-named means comprising cooperating stop surfaces on said coupler and said first-named means.

11. The combination of a coupler having a portion for insertion into a hose, a hose surrounding said portion, and a clamp for clamping said hose to said portion comprising U-shaped elements positioned crosswise on said hose and extending in opposite directions, plates at opposite sides of the hose, means engaging said plates and said elements for drawing said elements into clamping position on said hose, and mutually engaging abutment surfaces on said coupler and plates for anchoring said plates to said coupler.

12. A hose-clamp comprising U-shaped elements extending in opposite directions and adapted to be positioned over a hose, and a structure adapted to be positioned to extend at opposite sides of the hose and to which said elements are anchored.

13. A hose-clamp comprising U-shaped elements extending in opposite directions and adapted to be positioned over a hose, a structure adapted to be positioned to extend at opposite sides of the hose, and means engaging the ends of said elements and said structure for drawing said elements into clamping position on the hose.

14. A hose-clamp comprising U-shaped elements extending in opposite directions and adapted to be positioned over a hose, and plates adapted to be positioned to extend at opposite sides of the hose and to which said elements are anchored.

15. The combination of a coupler having a portion for insertion into a hose, a hose surrounding said portion, and a clamp for clamping said hose to said portion comprising U-shaped elements positioned crosswise on said hose and clamping the latter and extending in opposite directions, the ends of said elements being spaced apart a distance less than the outside diameter of said hose.

16. The combination of a coupler having a portion for insertion into a hose, a hose surrounding said portion, and a clamp for clamping said hose to said portion comprising U-shaped elements positioned crosswise on said hose and extending in opposite directions, plates at opposite sides of the hose, and means engaging said plates and said elements for drawing said elements into clamping position on said hose the ends of said elements being spaced apart a distance less than the outside diameter of said hose.

17. The combination of a coupler having a portion for insertion into a hose, a hose surrounding said portion, and a clamp for clamping said hose to said portion comprising U-bolts positioned crosswise of said hose and extending in opposite directions, plates at opposite sides of said hose and containing openings through which the ends of said bolts extend, and means engaging the ends of said elements and said plates for drawing said elements into clamping position on said hose, said openings being spaced apart a distance less than the inside diameter of said bolts.

18. The combination of a coupler having a portion for insertion into a hose, a hose surrounding said portion, and a clamp for clamping said hose to said portion comprising U-bolts positioned crosswise of said hose and extending in opposite directions, plates at opposite sides of said hose, said plates containing grooves on their inner surfaces for receiving the curved portions of said bolts, and means engaging said plates and said elements for drawing said elements into clamping position on said hose.

19. A hose-clamp comprising U-bolts extending in opposite directions and adapted to be positioned over a hose, a structure adapted to be positioned to extend at opposite sides of the hose, and means engaging the ends of said bolts and said structure for drawing said bolts into clamping position on the hose, said plates containing grooves on their inner surfaces adapted to receive the curved portions of said bolts.

20. A hose-clamp comprising U-bolts extending in opposite directions and adapted to be positioned over a hose, and plates adapted to be positioned to extend at opposite sides of the hose and to which said bolts are anchored, said plates containing grooves on their inner surfaces adapted to receive the curved portions of said bolts.

HARRY E. DENNIE.